United States Patent
Chang (10) Patent No.: US 9,690,369 B2
(45) Date of Patent: Jun. 27, 2017

(54) FACIAL EXPRESSION CONTROL SYSTEM, FACIAL EXPRESSION CONTROL METHOD, AND COMPUTER SYSTEM THEREOF

(71) Applicant: Wistron Corporation, New Taipei (TW)

(72) Inventor: Chih-Sung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 301 days.

(21) Appl. No.: 14/058,510

(22) Filed: Oct. 21, 2013

(65) Prior Publication Data
US 2014/0139424 A1     May 22, 2014

(30) Foreign Application Priority Data
Nov. 22, 2012    (TW) .............................. 101143737 A (51) Int. Cl.
G06F 3/01     (2006.01)
G06K 9/00     (2006.01)
G06F 21/32     (2013.01)

(52) U.S. Cl.
CPC .............. *G06F 3/011* (2013.01); *G06F 3/012* (2013.01); *G06F 3/013* (2013.01); *G06F 21/32* (2013.01);
(Continued)

(58) Field of Classification Search
None
See application file for complete search history.

(56) References Cited

U.S. PATENT DOCUMENTS 5,866,903 A * 2/1999 Morita ................. G01N 23/225
                                                                         250/307
8,748,816 B2 * 6/2014 Kooijman .......... G01N 23/2206
                                                                         250/305

(Continued)

FOREIGN PATENT DOCUMENTS

CN          1188948 A     7/1998
CN       101405744 A     4/2009
(Continued)

OTHER PUBLICATIONS

Office Action dated Nov. 24, 2014 from corresponding TW patent application No. 101143737 with English translation of the relevant portions.

(Continued)

*Primary Examiner* — Tsung-Yin Tsai
(74) *Attorney, Agent, or Firm* — Muncy, Geissler, Olds & Lowe, P.C.

(57) ABSTRACT

A facial expression control system, a facial expression control method, and a computer system thereof are disclosed. The facial expression control system includes a face detection module, a database, and a processing module. The face detection module is used for determining whether a facial expression feature is detected in a captured image. The database is used for storing a control parameter table, wherein the control parameter table is corresponding to the facial expression feature. If the face detection module detects the facial expression feature, the control parameter table of the database is accessed according to the facial expression feature to get an encode signal and transmitted to the processing module. The processing module is used for generating a control signal according to the encode signal.

15 Claims, 8 Drawing Sheets

| | First user 60a | | | Second user 60b | | |
|---|---|---|---|---|---|---|
| Right eye feature 71a | Left eye feature 72a | Mouth feature 73a | Right eye feature 71b | Left eye feature 72b | Mouth feature 73b |
| 0 | 0 | 0 | 0 | 0 | 0 |
| 0 | 0 | 0 | 0 | 0 | 1 |
| 0 | 0 | 0 | 0 | 1 | 0 |
| 0 | 0 | 0 | 0 | 1 | 1 |
| 0 | 0 | 0 | 1 | 0 | 0 |
| ... | | | | | |
| 1 | 1 | 1 | 1 | 0 | 0 |
| 1 | 1 | 1 | 1 | 0 | 1 |
| 1 | 1 | 1 | 1 | 1 | 0 |
| 1 | 1 | 1 | 1 | 1 | 1 |

(52) U.S. Cl.
CPC ..... *G06K 9/00308* (2013.01); *G06K 9/00315* (2013.01); *G06F 2203/011* (2013.01)

(56) References Cited

U.S. PATENT DOCUMENTS

| | | | | |
|---|---|---|---|---|
| 8,850,597 B1* | 9/2014 | Gates | ................ | G06F 17/30528 726/26 |
| 8,887,300 B1* | 11/2014 | Gates | ................ | H04L 63/10 713/168 |
| 2002/0153508 A1* | 10/2002 | Lynch | ................ | A01N 25/04 252/299.01 |
| 2003/0060836 A1* | 3/2003 | Wang | ................ | A61B 17/1128 606/152 |
| 2003/0081834 A1* | 5/2003 | Philomin | ................ | G06F 3/011 382/190 |
| 2004/0011958 A1* | 1/2004 | Wright | ................ | G01N 23/203 250/307 |
| 2004/0028815 A1* | 2/2004 | Castellano | ................ | B01J 19/0046 427/282 |
| 2005/0135695 A1* | 6/2005 | Bernard | ................ | G06K 9/3233 382/254 |
| 2008/0218472 A1* | 9/2008 | Breen | ................ | G06F 3/015 345/156 |
| 2009/0055653 A1* | 2/2009 | Huang | ................ | H04L 9/3226 713/182 |
| 2009/0110248 A1* | 4/2009 | Masuda | ................ | G06F 21/32 382/118 |
| 2009/0251560 A1* | 10/2009 | Azar | ................ | G06F 21/32 348/222.1 |
| 2009/0285454 A1* | 11/2009 | Xu | ................ | G06K 9/00221 382/118 |
| 2011/0026839 A1* | 2/2011 | Bogart | ................ | G06T 11/60 382/217 |
| 2011/0058051 A1 | 3/2011 | Jeon et al. | | |
| 2011/0080260 A1* | 4/2011 | Wang | ................ | G06F 21/32 340/5.83 |
| 2011/0135166 A1* | 6/2011 | Wechsler | ................ | G06K 9/00288 382/118 |
| 2011/0158546 A1 | 6/2011 | Huang et al. | | |
| 2012/0181425 A1* | 7/2012 | Oohashi | ................ | G01N 23/2251 250/307 |
| 2013/0015946 A1* | 1/2013 | Lau | ................ | G07C 9/00 340/5.2 |
| 2014/0004194 A1* | 1/2014 | Subramanian | ................ | A61K 9/08 424/489 |
| 2014/0091216 A1* | 4/2014 | Kinoshita | ................ | G01N 23/2252 250/310 |
| 2014/0255772 A1* | 9/2014 | Kyu | ................ | H01M 10/052 429/189 |
| 2015/0247908 A1* | 9/2015 | Liu | ................ | G01R 33/4804 324/309 |

FOREIGN PATENT DOCUMENTS

| | | |
|---|---|---|
| CN | 102014198 A | 4/2011 |
| JP | 2006125952 A * | 5/2006 |
| TW | 201113741 A | 4/2011 |
| TW | 201122905 A1 | 7/2011 |
| TW | M412400 U | 9/2011 |
| TW | 201138440 A | 11/2011 |

OTHER PUBLICATIONS

Taiwanese Office Action dated Dec. 15, 2016 from corresponding Application No. 101143737 with partial translation; 9 pgs.

* cited by examiner

| Right eye feature 71 | Left eye feature 72 | Mouth feature 73 |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

| First user 60a | | | Second user 60b | | |
|---|---|---|---|---|---|
| Right eye feature 71a | Left eye feature 72a | Mouth feature 73a | Right eye feature 71b | Left eye feature 72b | Mouth feature 73b |
| 0 | 0 | 0 | 0 | 0 | 0 |
| 0 | 0 | 0 | 0 | 0 | 1 |
| 0 | 0 | 0 | 0 | 1 | 0 |
| 0 | 0 | 0 | 1 | 1 | 1 |
| ... | ... | ... | ... | ... | ... |
| 1 | 1 | 1 | 1 | 0 | 0 |
| 1 | 1 | 1 | 1 | 0 | 1 |
| 1 | 1 | 1 | 1 | 1 | 0 |
| 1 | 1 | 1 | 1 | 1 | 1 |

FACIAL EXPRESSION CONTROL SYSTEM, FACIAL EXPRESSION CONTROL METHOD, AND COMPUTER SYSTEM THEREOF

BACKGROUND OF THE DISCLOSURE

1. Field of the Disclosure

The present disclosure relates to a facial expression control system, a facial expression control method, and a computer system thereof, and more particularly, to a facial expression control system, a facial expression control method, and a computer system thereof, which is controlled by using facial expression features.

2. Description of the Related Art

With the advancement of technology, information security is increasingly emphasized. Therefore, in addition to manually entering a password, a face unlock feature has been developed for mobile phones or computer systems, which uses a face detection technology to detect the user in order to turn on the mobile phone or computer system. In the prior art, however, such face detection technology can only achieve the purpose of unlocking when it detects that the user is identical to the person who originally did the setting. In actual applications, external factors such as user's makeup or wearing glasses (or not) may cause detection errors. On the other hand, the face detection technology in the prior art was unable to provide more complex password settings. As such, a person may use the original user's photo or image as a cracking tool to unlock easily.

Accordingly, it is necessary to devise a new facial expression control system, a facial expression control method, and a computer system thereof to address the deficiencies in the art.

SUMMARY OF THE DISCLOSURE

It is a major objective of the present disclosure to provide a facial expression control system which uses facial expression features for controls to achieve its effects.

It is another objective of the present disclosure to provide a facial expression control method.

It is a further objective of the present disclosure to provide a computer system having the above-mentioned facial expression control system.

To achieve the above objectives, the facial expression control system of the present disclosure is provided in a computer system to control the computer system. The computer system includes an image capture module for capturing a captured image of a user. The facial expression control system includes a face detection module, a database, and a processing module. The face detection module is electrically connected to the image capture module and used for determining whether a facial expression feature is detected in the captured image. The database is used for storing the control parameter table, wherein the control parameter table is corresponding to the facial expression feature. The processing module is electrically connected to the database and the face detection module; wherein if the face detection module detects a facial expression feature, the control parameter table of the database is accessed according to the facial expression feature to get an encode signal and transmitted to the processing module. The processing module generates a control signal according to the encode signal.

The facial expression control method of the present disclosure includes the following steps: setting the control parameter table; capturing a captured image; determining whether a facial, expression feature is detected in the captured image; if yes, accessing the control parameter table according to the facial expression feature to get the encode signal; and generating a control signal according to the encode signal.

The computer system of the present disclosure includes an image capture module and a facial expression control system. The image capture module is used for capturing a captured image of a user. The facial expression control system includes a face detection module, a database, and a processing module. The face detection module is electrically connected to the image capture module and used for determining whether a facial expression feature is detected in the captured image. The database is used for storing a control parameter table, wherein the control parameter table is corresponding to the facial expression feature. The processing module is electrically connected to the database and the face detection module; wherein if the face detection module detects a facial expression feature, the control parameter table of the database is accessed according to the facial expression feature to get an encode signal and transmitted to the processing module. The processing module generates a control signal according to the encode signal.

DETAILED DESCRIPTION OF THE PREFERRED EMBODIMENT

The technical content of the present disclosure will become more apparent from the following detailed description of a preferred embodiment.

Figure 1:
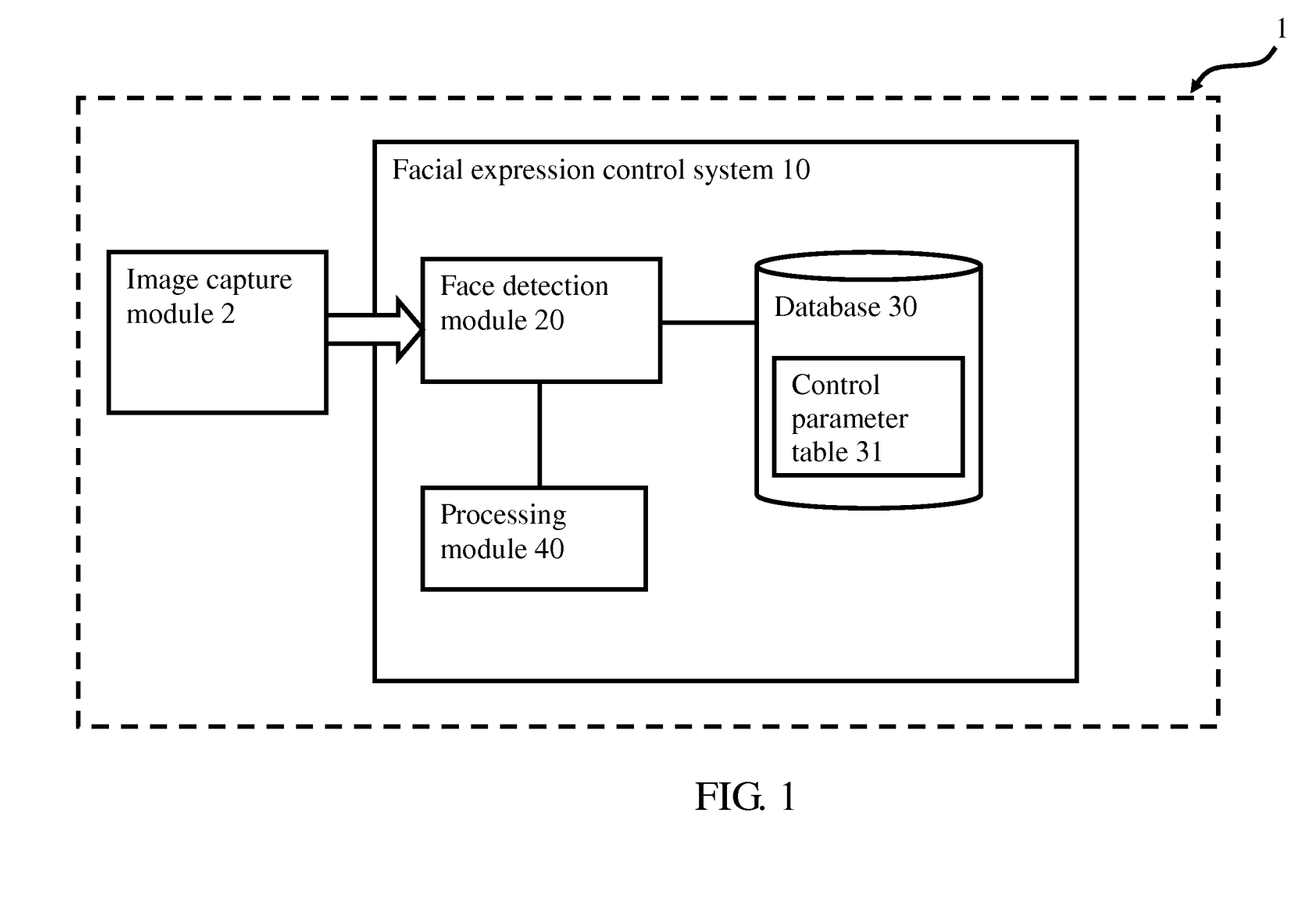
FIG. 1 is an architecture diagram of a facial expression control system and a computer system thereof in the present disclosure.

Please first refer to FIG. 1, which is an architecture diagram of a facial expression control system of the present disclosure.

Figure 2A:
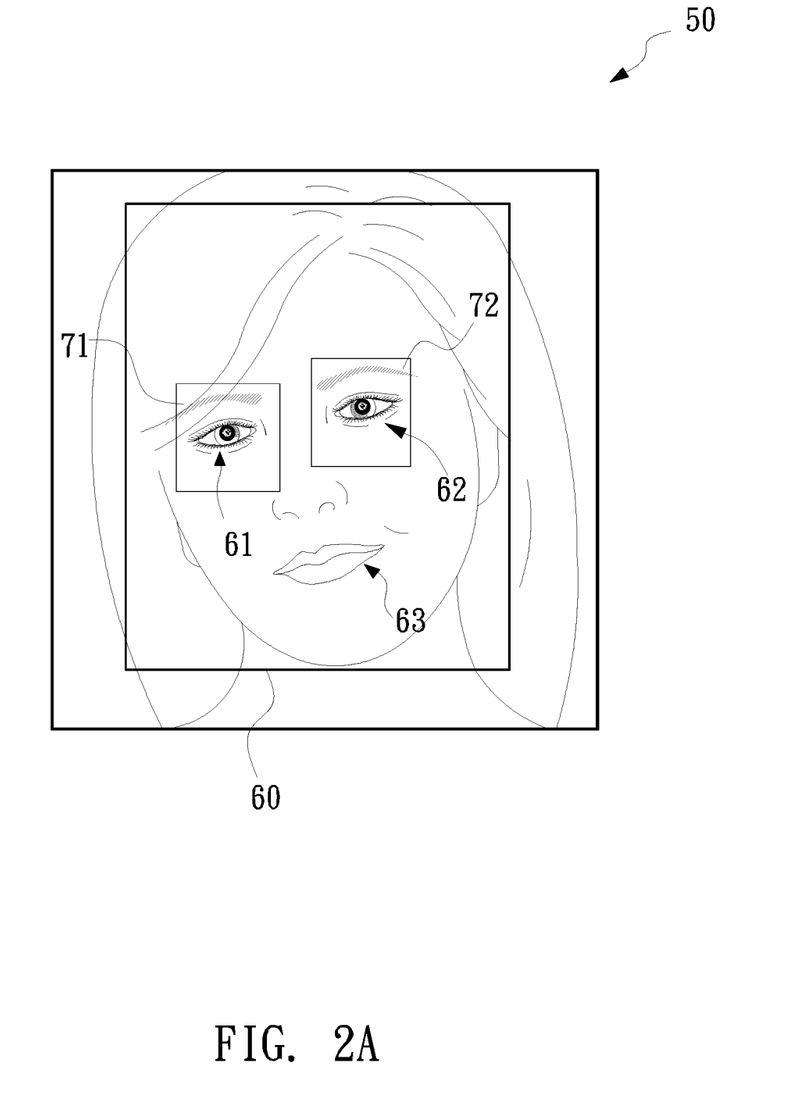
FIG. 2A is a view showing an captured image of the facial expression control system in a first embodiment of the present disclosure.

The facial expression control system 10 of the present disclosure can be disposed within a computer system 1. The computer system 1 may be a desktop computer, a notebook computer, a tablet PC, or a mobile phone, but the present disclosure is not limited to the above-mentioned device. The computer system 1 is provided with an image capture module 2. The image capture module 2 may be composed by an optical element such as a CCD or CMOS with the image capture function. The facial expression control system 10 allows users to utilize facial expressions to issue a control command to turn on the computer system 1 or control other features. Accordingly, when operating the computer system 1, an image capture module 2 is first used to capture a user face to get a captured image 50 (as shown in FIG. 2A), and then it is controlled by a facial expression control system 10.

Figure 2B:
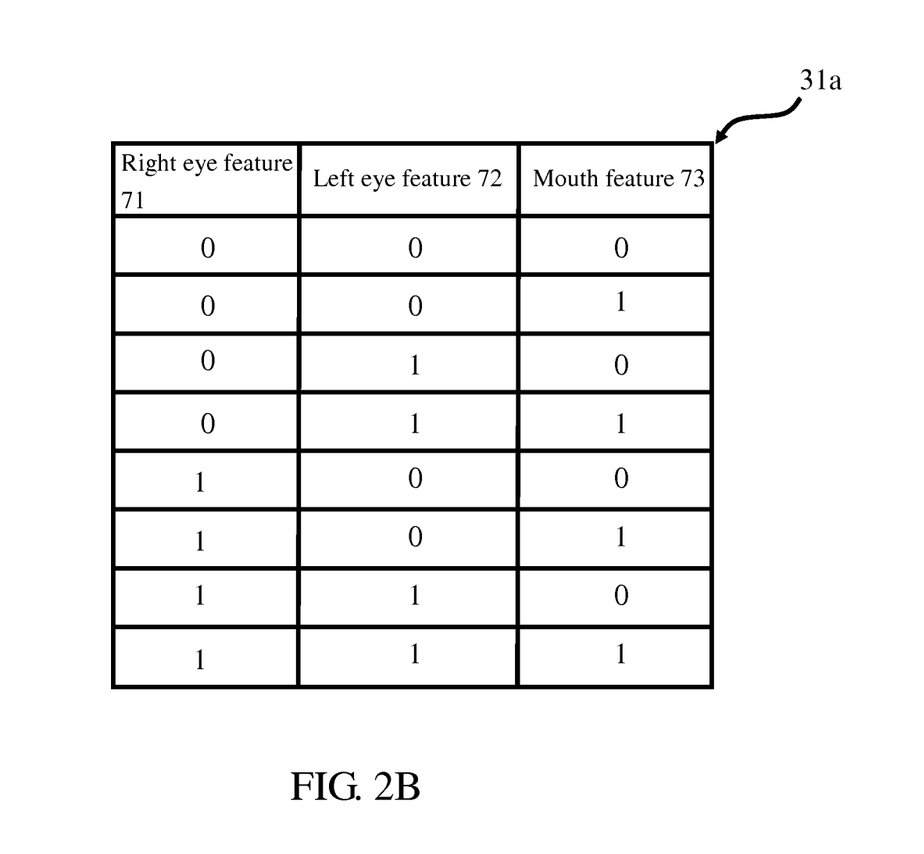
FIG. 2B shows a control parameter table according to FIG. 2A in the first embodiment of the present disclosure.

The facial expression control system 10 includes a face detection module 20, a database 30, and a processing module 40. The face detection module 20 and the processing module 40 are electrically connected to each other, and may be configured by hardware, firmware, or a combination of hardware and software, but the present disclosure is not limited to this. The face detection module 20 is electrically connected to the image capture module 2 for determining whether at least a facial expression feature is detected in a captured image 50 captured by the image capture module 2 through the face detection technology. For general users, a right eye, a left eye, and a mouth are all easily acting facial features; therefore, in a preferred embodiment of the present disclosure, a right eye feature 71, a left eye feature 72, and a mouth feature 73 (as shown in FIG. 2B) are used as facial expression features, but the present disclosure is not limited to simultaneously detecting the above-mentioned three facial expression features. The face detection module 20 detects whether the user's left eye and right eye are open or closed, which will be regarded as the right eye feature 71 or the left eye feature 72. Furthermore, the face detection module 20 detects whether the user's mouth is open or closed, which will be regarded as the mouth feature 73.

It should be further noted that the face detection process and technology used by the face detection module 20 to detect images have been widely applied by those skilled in the art relative to the present disclosure, and thus the principle will not be repeated here.

The database 30 is used for storing a control parameter table 31. The control parameter table 31 can be set according to a possible number of facial expression features, such that different facial expression features can be corresponding to different encode signals. The processing module 40 is electrically connected to the database 30 and the face detection module 20. When the face detection module 20 detects a facial expression feature, the face detection module 20 queries the control parameter table 31 of the database 30 according to the detected facial expression feature to generate an encode signal, and then transmits the encode signal to the processing module 40, such that the encode signal can generate a control signal. On the other hand, the face detection module 20 can also detect a facial feature of a different user in the captured image 50 to get the user account, which can also be stored in the control parameter table 31. The processing module 40 further generates a different control command according to the different user account. Therefore, even if the same facial expression feature is detected, the processing module 40 can issue a different control signal for a different user.

As shown in FIG. 2A, which is a view showing a captured image of the facial expression control system in a first embodiment of the present disclosure. Also refer to FIG. 2B, which shows a control parameter table according to FIG. 2A in the first embodiment of the present disclosure.

As seen in FIG. 2A, the image capture module 2 in the first embodiment of the present disclosure gets a captured image 50 with regard to the face of a user 60. In the captured image 50, the left eye 62 and right eye 61 of the user 60 is open, while the mouth 63 is not open. Accordingly, the face detection module 20 is able to detect the right eye feature 71 and the left eye feature 72, but is unable to detect the mouth feature 73.

In the case that there is only one user 60, the control parameter table 31a of the database 30 can store 8 sets of code. As can be seen, the processing module 40 can get eight different results in a way of determining whether the right eye feature 71, the left eye feature 72, or the mouth feature 73 is detected in order to generate eight different control signals. Accordingly, in the first embodiment of the present disclosure, the face detection module 20 can detect the encode signal (1,1,0) in the captured image 50. The processing module 40 then generates the corresponding control signal according to this encode signal. It can be seen that the user 60 can get different control signals in the way of open eyes, closed eyes, open mouth, or closed mouth to control the computer system 1 more flexibly.

Figure 3A:
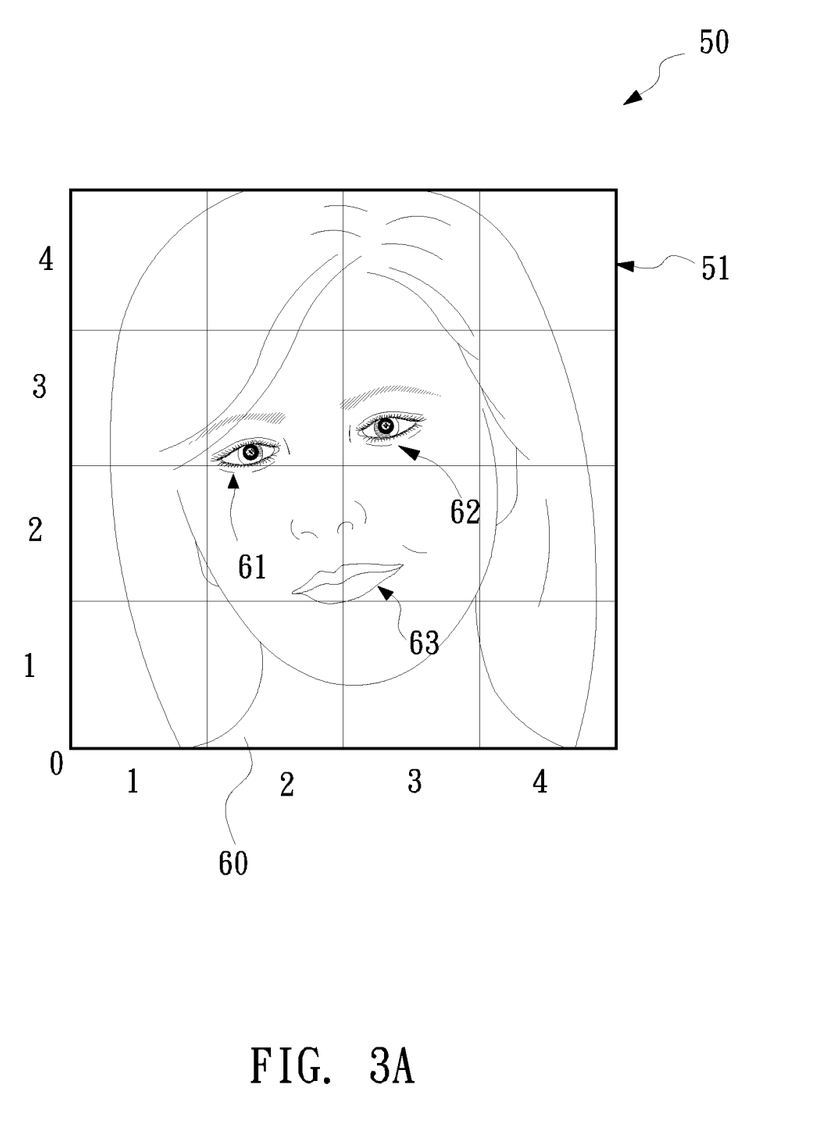
FIG. 3A is a view showing an captured image of the facial expression control system in a second embodiment of the present disclosure.

Then, please refer to FIG. 3A, which is a view showing a captured image of the facial expression control system in a second embodiment of the present disclosure. Also refer to FIG. 3B, which shows a control parameter table according to FIG. 3A in the second embodiment of the present disclosure.

In the second embodiment of the present disclosure, the captured image 50 can be divided into a plurality of corresponding regions 51, and the face detection module 20 can correspond respectively the position of the right eye 61, the left eye 62, or the mouth 63 of the user 60 to the corresponding region 51. As can be seen, when the face detection module 20 detects a facial expression feature, the face detection module 20 can correspond the right eye feature 71, the left eye feature 72, and the mouth feature 73 with the corresponding region 51 to get a corresponding coordinate value. Take FIG. 3A for example, when the corresponding regions 51 are divided into 16 regions, the coordinate value of the right eye feature 71 is (2,3) and the coordinate value of the left eye feature 72 is (3,3), but the mouth feature 73 is not detected.

Figure 3B:
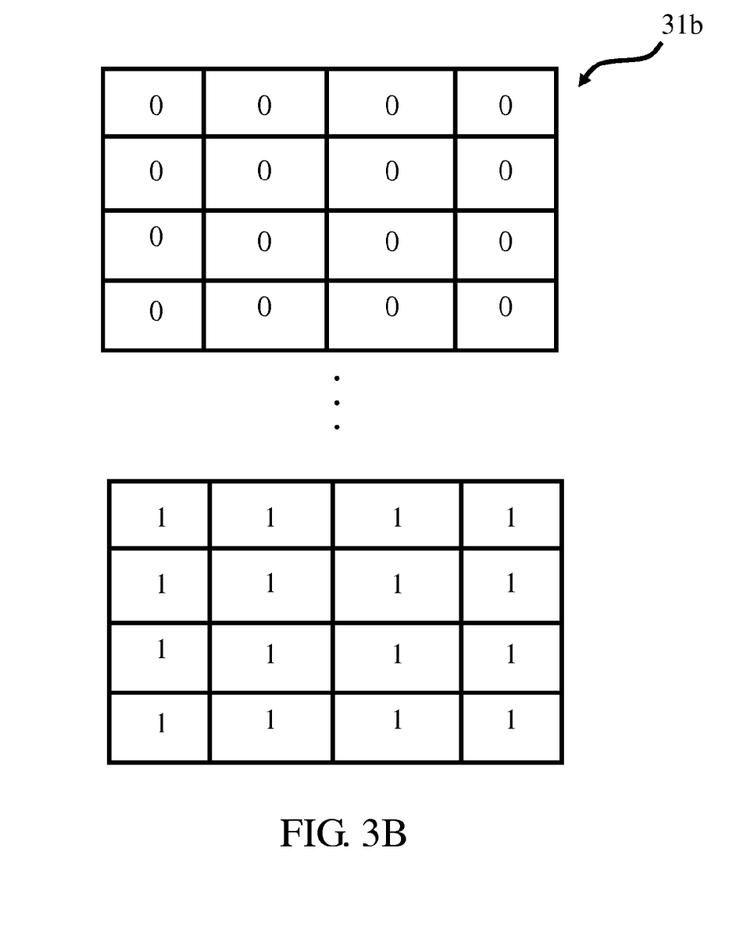
FIG. 3B shows a control parameter table according to FIG. 3A in the second embodiment of the present disclosure.

If the captured image 50 is divided into 16 corresponding regions 51, the control parameter table 31 can store 2^16 code; that is, the control parameter table 31b includes 65536 sets of code. That is, the processing module 40 can generate up to 65536 different control signals at the same time according to facial expression features of different users in different locations. Accordingly, in the second embodiment of the present disclosure, the face detection module 20 can detect that the corresponding coordinate value (2,3) and (3,3) of the encode signal is 1 in the captured image 50. The processing module 40 then generates the corresponding control signal according to this encode signal to control the computer system 1.

Figure 4A:
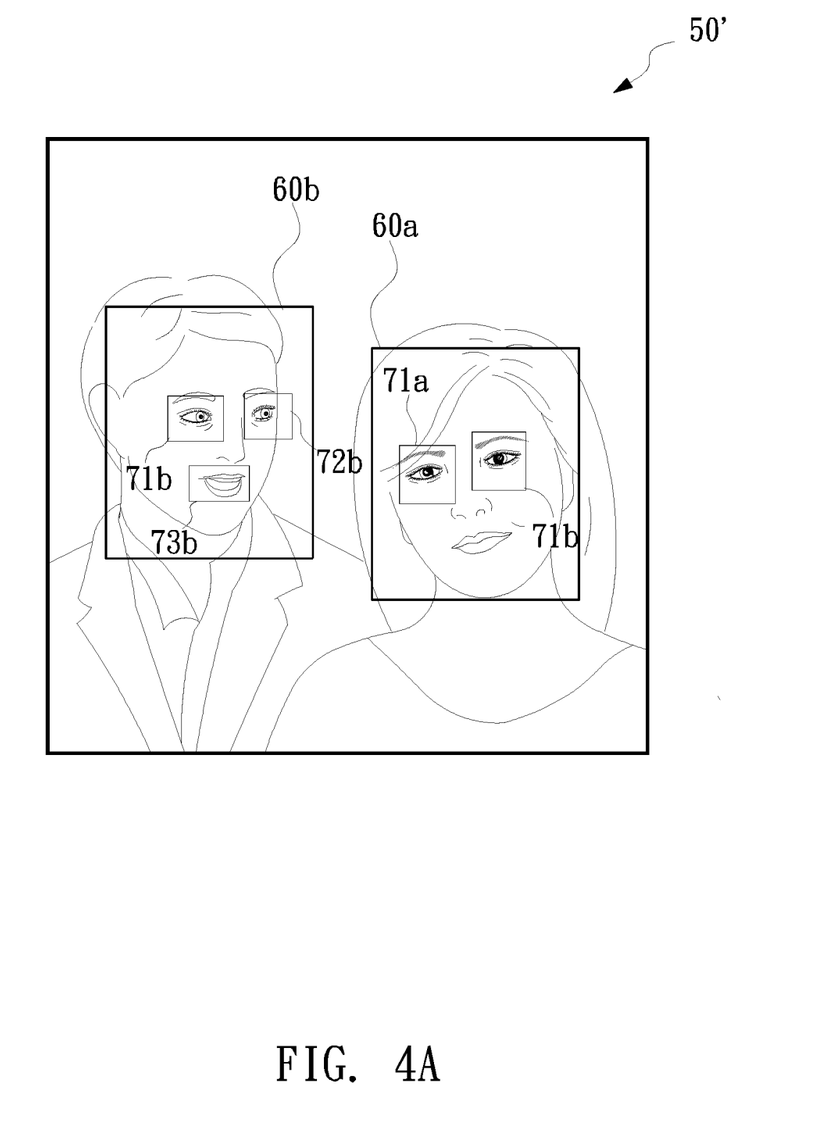
FIG. 4A is a view showing an captured image of the facial expression control system in a third embodiment of the present disclosure.

Then, please refer to FIG. 4A, which is a view showing a captured image of the facial expression control system in a third embodiment of the present disclosure. Also refer to FIG. 4B, which shows a control parameter table according to FIG. 4A in the e third embodiment of the present disclosure.

The image capture module 2 can capture a captured image 50' having both a first user 60a and a second user 60b. As shown in FIG. 4A, at this time, the face detection module 20 simultaneously detects a right eye feature 71a and a left eye feature 72a of the first user 60a and a right eye feature 71b, a left eye feature 72b, and a mouth feature 73b of the second user 60b.

Figure 4B:
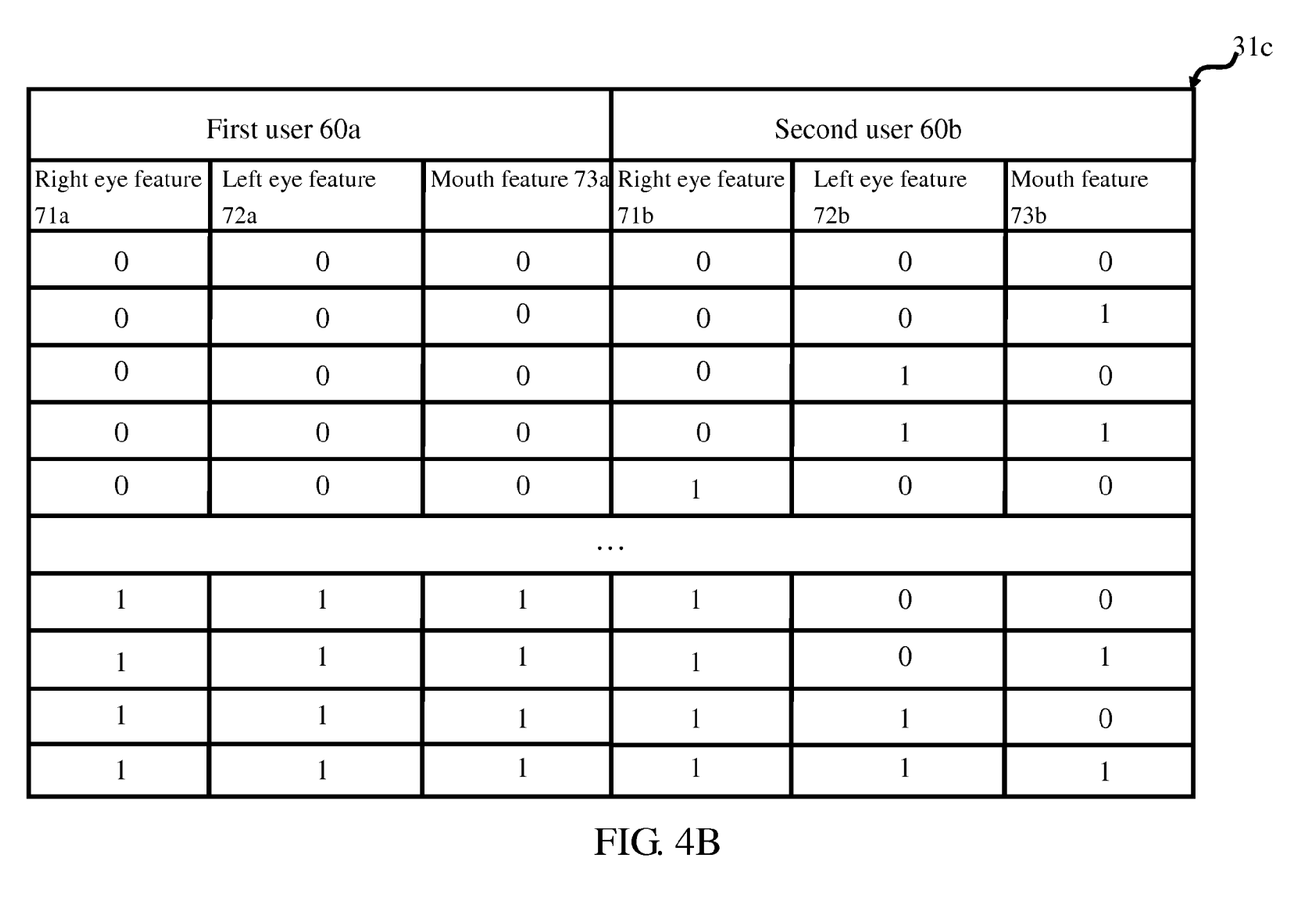
FIG. 4B shows a control parameter table according to FIG. 4A in the third embodiment of the present disclosure.

In the first embodiment, the control parameter table 31a of the database 30 can store 8 sets of code for a single user. In the case that there is a first user 60a and a second user 60b in a third embodiment, the control parameter table 31c can store 64 sets of code. It can be seen that the processing module 40 can determine respectively whether there is a right eye feature 71*a*, a left eye feature 72*a*, or a mouth feature 73*a* according to an image of the first user 60*a*, and can determine whether there is a right eye feature 71*b*, a left eye feature 72*b*, or a mouth feature 73*b* according to an image of the second user 60*b* to get 64 different results and then generate 64 different control signals. Therefore, in the third embodiment of the present disclosure, the face detection module 20 can detect the encode signal (1,1,0) in the control parameter table 31*c* from the captured image 50' of the first user 60*a*, and detect the encode signal as (1,1,1) relative to the second user 60*b*. The processing module 40 then generates the corresponding control signal according to this encode signal. As can be seen, the facial expression control system 10 can get a plurality of right eye features, a plurality of left eye features, or a plurality of mouth features from a plurality of users to control the computer system 1.

Likewise, the face detection module 20 can also divide the captured image 50' into a plurality of corresponding regions 51, similar to the second embodiment of the present disclosure. In the case of a plurality of users, since the database 30 also has a control parameter table 31*b* identical to that of the second embodiment, and thus the redundant description will be omitted.

Figure 5:
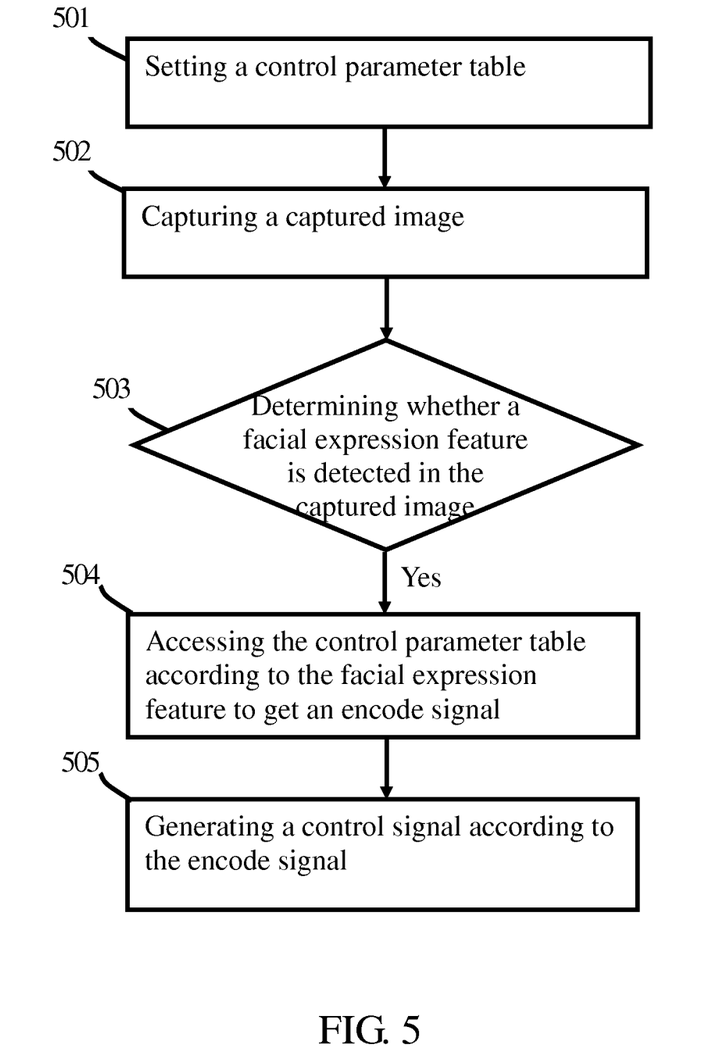
FIG. 5 is a flowchart showing a facial expression control method in the present disclosure.

Finally, please refer to FIG. 5, which is a flowchart showing a facial expression control method in the present disclosure. It should be noted here that the computer system 1 of the facial expression control system 10 is used as an example hereinafter to illustrate the facial expression control method in the present disclosure, but the facial expression control method of the present disclosure is not limited to the use of the facial expression control system 10 and the computer system 1 thereof.

At first, the facial expression control system 10 of the present disclosure undergoes Step 501: setting a control parameter table.

First, a control parameter table 31 is created in the database 30. The control parameter table 31 can be determined based on the number of users, the type and number of the facial expression features, and whether a plurality of corresponding regions 51 needs to be divided. That is, a control parameter table 31*a* of the first embodiment, a control parameter table 31*b* of the second embodiment, or a control parameter table 31*c* of the third embodiment can be created in the database 30. The database 30 may include a plurality of control parameter tables 31, but the present disclosure is not limited to this.

Next, perform Step 502: capturing a captured image.

Next, the image capture module 2 captures a captured image 50 of a user and transmits the captured image 50 to the face detection module 20.

Then, perform Step 503: determining whether a facial expression feature is detected in the captured image.

After the face detection module 20 gets the captured image 50, the face detection module 20 determines whether the facial expression feature of a single user or a plurality of users are detected in the captured image 50 through the face detection technology. The facial expression feature includes a right eye feature 71, a left eye feature 72, and a mouth feature 73.

If the face detection module 20 detects a facial expression feature, go to Step 504: accessing the control parameter table according to the facial expression feature to get an encode signal.

The face detection module 20 accesses the control parameter table 31 of the database 30, e.g. the control parameter tables 31*a* to 31*c* mentioned above, according to the detected facial expression feature to get an encode signal, and then transmits the encode signal to the processing module 40.

Finally, perform Step 505: generating a control signal according to the encode signal.

At last, the processing module 40 generates a different control signal according to a different encode signal to control the computer system 1.

It should be noted here that he facial expression control method of the present disclosure is not limited to the order of the above-mentioned steps. The order of the above-mentioned steps can be changed as long as the objectives of the present disclosure can be achieved.

Through the facial expression control system 10 and the facial expression control method thereof in the present disclosure, users can easily and safely control unlocking or other features of the computer system 1.

As described above, the objectives, means, and effectiveness in the present disclosure are different to the characteristics in the prior art. It is appreciated that the patent application can be issued as early as possible to benefit the society. It should be also noted that the embodiments described above are for illustrative purposes, the disclosed claims of the present disclosure should be within the range of the accompanying claims, and should not be limited to the aforementioned embodiments.

What is claimed is:

1. A facial expression control system used in a computer system for controlling the computer system having an image capture module for capturing a captured image of a plurality of user, the facial expression control system comprising:
    a face detection module, electrically connected to the image capture module for determining whether a plurality of facial expression feature associated with respective facial components is detected in the captured image, wherein the plurality of facial expression features comprises a right eye feature, a left eye feature, and a mouth feature, each of which is presented in a binary form; and dividing the captured image into a plurality of corresponding regions to make the detected facial expression feature correspond to the plurality of corresponding regions to get a corresponding coordinate value;
    a database for storing a binary form control parameter table, wherein the binary form control parameter table is corresponding to the plurality of facial expression feature; and
    a processing module electrically connected to the database and the face detection module; wherein if the face detection module detects the plurality of facial expression feature, the binary form control parameter table of the database is accessed according to a combination of the plurality of facial expression features and the corresponding coordinate value to get a binary form encode signal and transmitted to the processing module which generates a predetermined control signal for the combination of the plurality of facial expression features according to the binary form encode signal.

2. The facial expression control system as claimed in claim 1, wherein the face detection module detects an open eyes expression or a closed eyes expression to be respectively regarded as the right eye feature or the left eye feature.

3. The facial expression control system as claimed in claim 1, wherein the face detection module detects an open mouth expression or a closed mouth expression to be regarded as the mouth feature.

4. The facial expression control system as claimed in claim 1, wherein the face detection module simultaneously detects a plurality of right eye features, a plurality of left eye features, and a plurality of mouth features in the captured image; the face detection module further accesses the binary form control parameter table of the database according to the plurality of right eye features, the plurality of left eye features, and the plurality of mouth features to get the binary form encode signal.

5. The facial expression control system as claimed in claim 1, wherein the face detection module further detects a user's facial feature to get a user account; the processing module further generates different control signals according to different user accounts.

6. A facial expression control method used in a facial expression control system to control a computer system, the method comprises the following steps:
    setting a binary form control parameter table;
    capturing a captured image;
    dividing the captured image into a plurality of corresponding regions;
    determining whether a plurality of facial expression feature associated with respective facial components is detected in the captured image, wherein the plurality of facial expression features comprises a right eye feature, a left eye feature, and a mouth feature, each of which is presented in a binary form;
    if yes, corresponding the detected plurality of facial expression feature with the corresponding region to get a corresponding coordinate value;
    accessing the binary form control parameter table according to a combination of the plurality of facial expression features and the corresponding coordinate value to get a binary form encode signal; and
    generating a predetermined control signal for the combination of the plurality of facial expression features according to the binary form encode signal.

7. The facial expression control method as claimed in claim 6, further comprising the following step:
    respectively detecting an open eyes expression or a closed eyes expression to be regarded as the right eye feature or the left eye feature.

8. The facial expression control method as claimed in claim 6, further comprising the following step:
    detecting an open mouth expression or a closed mouth expression to be regarded as the mouth feature.

9. The facial expression control method as claimed in claim 6, wherein getting the binary encode signal further comprising the following steps:
    detecting a plurality of right eye features, a plurality of left eye features, and a plurality of mouth features in the captured image simultaneously; and
    accessing the binary form control parameter table according to the plurality of right eye features, the plurality of left eye features, and the plurality of mouth features to get the binary form encode signal.

10. The facial expression control method as claimed in claim 6, further comprising the following steps:
    detecting facial features of a user to get a user account; and
    generating a different control signal according to a different user account.

11. A computer system, comprising:
    an image capture module for capturing a captured image of a plurality of user; and
    a facial expression control system, comprising:
    a face detection module electrically connected to the image capture module for determining whether a plurality of facial expression feature associated with respective facial components is detected in the captured image, wherein the plurality of facial expression features comprises a right eye feature, a left eye feature, and a mouth feature, each of which is presented in a binary form; and dividing the captured image into a plurality of corresponding regions to make the detected plurality of facial expression feature correspond to the plurality of corresponding regions to get a corresponding coordinate value;
    a database for storing a binary form control parameter table, wherein the binary form control parameter table is corresponding to the plurality of facial expression feature; and
    a processing module electrically connected to the database and the face detection module; wherein if the face detection module detects the plurality of facial expression feature, the binary form control parameter table of the database is accessed according to a combination of the plurality of facial expression features and the corresponding coordinate value to get a binary form encode signal and transmitted to the processing module which generated a predetermined control signal for the combination of the plurality of facial expression features according to the binary form encode signal.

12. The computer system as claimed in claim 11, wherein the face detection module detects an open eyes expression or a closed eyes expression respectively to be regarded as the right eye feature or the left eye feature.

13. The computer system as claimed in claim 11, wherein the face detection module detects an open mouth expression or a closed mouth expression to be regarded as the mouth feature.

14. The computer system as claimed in claim 11, wherein the face detection module simultaneously detects a plurality of right eye features, a plurality of left eye features, and a plurality of mouth features in the captured image; the face detection module further accesses the binary form control parameter table of the database according to the plurality of right eye features, the plurality of left eye features, and the plurality of mouth features to get the binary form encode signal.

15. The computer system as claimed in claim 11, wherein the face detection module further detects a user's facial feature to get a user account; the processing module further generates different control signals according to different user accounts.

* * * * *